US007777441B2

(12) United States Patent
Yoshihisa

(10) Patent No.: US 7,777,441 B2
(45) Date of Patent: Aug. 17, 2010

(54) MOTOR CONTROLLING METHOD, MOTOR CONTROLLING DEVICE, ORIGINAL READING APPARATUS, AND STORAGE MEDIUM HAVING PROGRAM STORED THEREON

(75) Inventor: Yasuhiko Yoshihisa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 375 days.

(21) Appl. No.: 11/865,291

(22) Filed: Oct. 1, 2007

(65) Prior Publication Data

US 2008/0094018 A1    Apr. 24, 2008

(30) Foreign Application Priority Data

Sep. 29, 2006  (JP) ............................. 2006-267586
Sep. 14, 2007  (JP) ............................. 2007-238824

(51) Int. Cl.
*G05B 1/06* (2006.01)

(52) U.S. Cl. .................. 318/652; 318/560; 318/568.16; 318/568.24

(58) Field of Classification Search ................. 318/652, 318/560, 568.16, 568.24
See application file for complete search history.

(56) References Cited

U.S. PATENT DOCUMENTS

| 5,210,478 | A   | * | 5/1993  | Sasaki et al.   | 318/632 |
|-----------|-----|---|---------|-----------------|---------|
| 5,432,419 | A   | * | 7/1995  | Watanabe et al. | 318/560 |
| 6,664,752 | B2  | * | 12/2003 | Kanayama et al. | 318/639 |
| 6,844,693 | B2  | * | 1/2005  | Tazawa et al.   | 318/561 |
| 7,362,070 | B2  | * | 4/2008  | Games et al.    | 318/605 |
| 2004/0085035 | A1 | * | 5/2004 | Tazawa et al.   | 318/432 |

FOREIGN PATENT DOCUMENTS

JP    2001-219613 A    8/2001

* cited by examiner

*Primary Examiner*—Bentsu Ro
*Assistant Examiner*—Thai Dinh
(74) *Attorney, Agent, or Firm*—Sughrue Mion, PLLC

(57) ABSTRACT

A motor controlling method according to the present invention involves causing rotation of a motor to commence by applying an initial power that can cause movement of an object to be transported to commence, to the motor; obtaining a position of the object to be transported after the motor has been controlled so as to cause the object to be transported to move to a target position based on a signal outputted in response to the rotation of the motor; and correcting an initial power to be used when movement of the object to be transported is caused to commence a next time in response to a difference between the target position and the obtained position of the object to be transported.

10 Claims, 7 Drawing Sheets

| CORRECTION AMOUNT A | | |
|---|---|---|
| | MODE 1 | MODE 2 |
| $n \leq a_1$ | 0 | 0 |
| $a_1 < n \leq a_2$ | 0 | 0 |
| $a_2 < n \leq a_3$ | 0 | -1 |
| $a_3 < n \leq a_4$ | 0 | -2 |
| $a_4 < n \leq a_5$ | -1 | -3 |
| $a_5 < n$ | -2 | -4 |

| CORRECTION AMOUNT B | | |
|---|---|---|
|  | MODE 1 | MODE 2 |
| $t \leq b_1$ | 0 | 0 |
| $b_1 < t \leq b_2$ | 0 | 0 |
| $b_2 < t \leq b_3$ | +1 | +1 |
| $b_3 < t \leq b_4$ | +2 | +2 |
| $b_4 < t \leq b_5$ | +3 | +3 |
| $b_5 < t$ | +4 | +4 |

MOTOR CONTROLLING METHOD, MOTOR CONTROLLING DEVICE, ORIGINAL READING APPARATUS, AND STORAGE MEDIUM HAVING PROGRAM STORED THEREON

CROSS-REFERENCE TO RELATED APPLICATIONS

The present application claims priority upon Japanese Patent Application No. 2006-267586 filed on Sep. 29, 2006, and Japanese Patent Application No. 2007-238824 filed on Sep. 14, 2007, which are herein incorporated by reference.

BACKGROUND

1. Technical Field

The present invention relates to motor controlling methods, motor controlling devices, original reading apparatuses, and storage media having program stored thereon.

2. Related Art

Hitherto, various motors such as DC (direct current) motors and stepping motors have been used in devices such as scanners and printers. For example, motors such as a motor for paper feeding and a motor for transporting a carriage in which a print head is fitted are provided in printers (see JP-A-2001-219613, for example).

In the aforementioned devices, it is desired to cause the motors to rotate at an extremely slow speed. This is because in a scanner for example, by causing the carriage transport motor to rotate at an extremely low speed (ultra low speed) and move the reading position of an image sensor fitted on the carriage at an extremely low speed, the reading resolution can be increased.

In this regard, in order to achieve ultra low speed motor driving, consideration has been given to employing a technique in which the motor is driven in a condition that the voltage applied thereto is lowered for example each time an output signal, which is outputted by an encoder or the like, is detected. However, there is a problem with this technique involving an initial duty at startup when the motor starts up from a state in which it is stopped.

That is, when the initial duty is high, which is unsuitable for the aforementioned ultra low speed control, the motor goes too far and cannot stop at a targeted stopping position (overshooting of the stopping position occurs). When this happens, the image sensor does not read the original at the intended target position but rather carries out reading of the original at a position overshot from the target position by a specific amount. In this case, a so-called "jaggy" phenomenon becomes undesirably conspicuous.

And conversely to this, when the initial duty is too low for the aforementioned ultra low speed control, the motor cannot reach the target position within the targeted time (the driving time in which the motor is driven is undesirably exceeded). In this case, a so-called dark current accumulates undesirably in the image sensor until the target position is reached, and the image sensor goes into a state in which a charge accumulation time is excessively exceeded (overcharging occurs). In this case, changes due to color irregularity occur before and after the reading by the image sensor.

For this reason, it is desired to drive the motor using an appropriate initial duty in order to improve the image quality in reading originals.

SUMMARY

The present invention has been devised in light of these circumstances and it is an advantage thereof to make possible improved image quality in reading by driving the motor using an appropriate initial duty.

In order to achieve the above-described advantage, a primary aspect of the invention is directed to a motor controlling method, comprising:

causing rotation of a motor to commence by applying an initial power that can cause movement of an object to be transported to commence, to a motor;

obtaining a position of the object to be transported after the motor has been controlled so as to cause the object to be transported to move to a target position based on a signal outputted in response to the rotation of the motor; and correcting an initial power to be used when movement of the object to be transported is caused to commence a next time in response to a difference between the target position and the obtained position of the object to be transported.

Other features of the invention will become clear through the explanation in the present specification and the description of the accompanying drawings.

DESCRIPTION OF EMBODIMENTS

Figure 1:
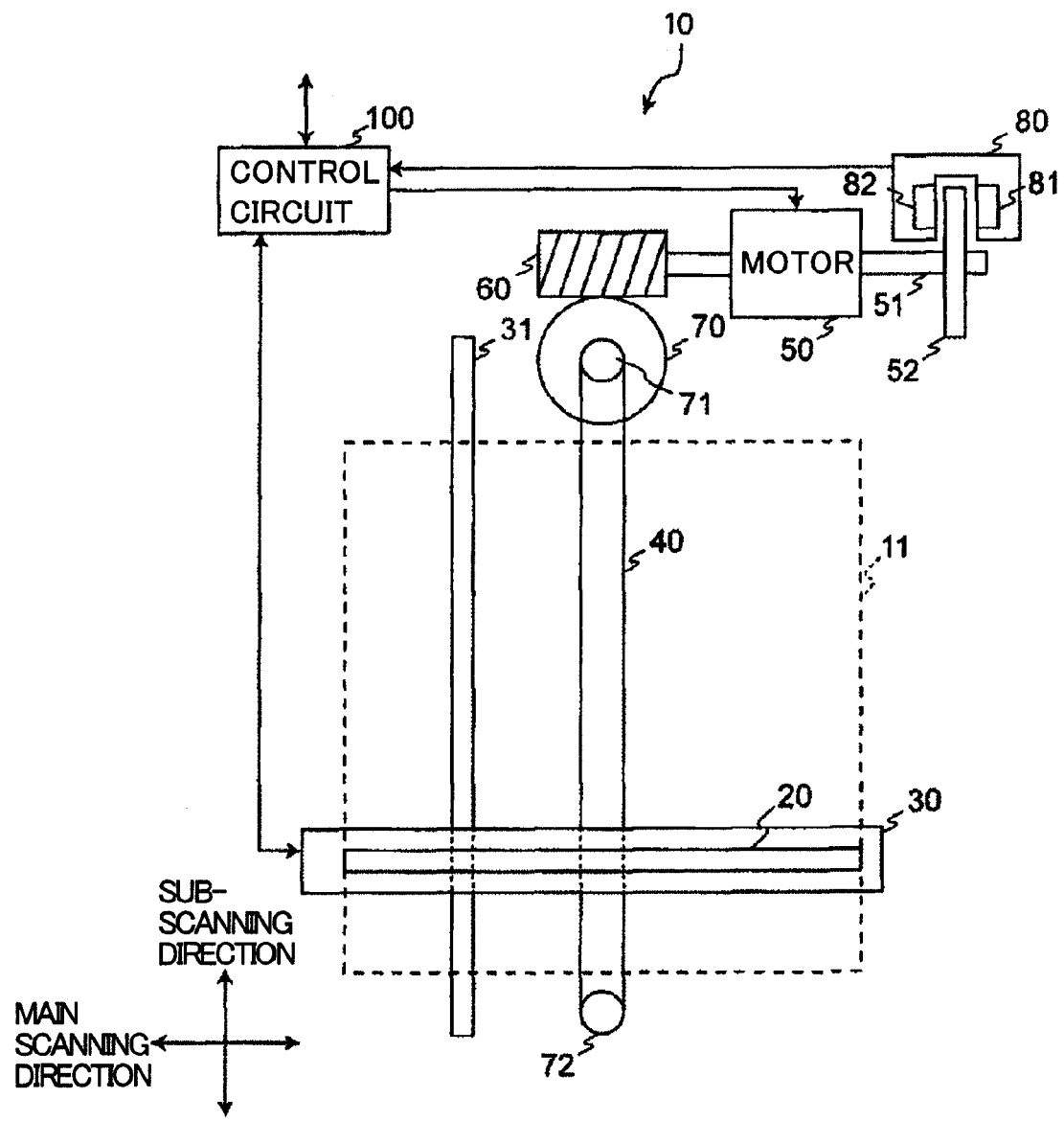
FIG. 1 shows an outline configuration of an original reading apparatus according to one embodiment.

At least the following matters will be made clear by the explanation in the present specification and the description of the accompanying drawings.

A motor controlling method, including:

causing rotation of a motor to commence by applying an initial power that can cause movement of an object to be transported to commence, to the motor;

obtaining a position of the object to be transported after the motor has been controlled so as to cause the object to be transported to move to a target position based on a signal outputted in response to the rotation of the motor; and correcting an initial power to be used when movement of the object to be transported is caused to commence a next time in response to a difference between the target position and the obtained position of the object to be transported.

When configured in this manner, the initial power to be used when movement of the object to be transported is caused to commence a next time is corrected in response to a difference between the target position and an obtained position of the object to be transported. Thus, for example, when the position of the object to be transported has exceeded the target position by a specific amount or more and has gone too far (position overshooting condition), it is possible to correct the initial power so as to eliminate the position overshooting condition. Furthermore, by carrying out correction of the initial power and aiming to make the initial power more suitable, it is possible to improve the image quality in reading originals.

In this motor controlling method, it is desirable that the initial power is a power in which an activation power for causing movement of the object to be transported to commence is added to a standby power that is a power unable to cause the object to be transported to start moving even when applied, and the correcting includes, when the obtained position of the object to be transported exceeds the target position, carrying out correction of the initial power by reducing the standby power used when movement of the object to be transported is caused to commence the next time.

When configured in this manner, the standby power is reduced by standby power correction. For this reason, when there is a position overshooting condition, the amount of position overshooting can be reduced by reducing the standby power, which enables elimination of the position overshooting condition.

Furthermore, in this motor controlling method, it is preferable that the correcting includes varying an amount by which the standby power is to be reduced in response to an amount by which the obtained position of the object to be transported exceeds the target position.

When configured in this manner, the extent of reducing the standby power can be varied in response to the extent by which the position of the object to be transported exceeds the target position, and therefore position overshooting condition in the initial driving of the motor can be effectively eliminated.

Furthermore, in this motor controlling method, it is preferable that the standby power is determined by multiplying a prescribed hold value that corresponds to a pre-correction standby power by a predetermined magnification and the magnification can be expressed in a fraction form, and the correcting includes reducing the standby power by reducing a numerator of the fraction form.

When configured in this manner, the position overshooting condition in the initial driving of the motor can be effectively eliminated using fine adjustments by reducing the numerator in the predetermined magnification.

Furthermore, in this motor controlling method, it is preferable that when a motor is to be controlled so as to cause an object to be transported to move to a target position, measuring a drive time of the motor until the object to be transported is moved to the target position, is further provided, and that the correcting further includes correcting the initial power to be used when movement of the object to be transported is caused to commence a next time, in response to a difference between a target drive time of when the object to be transported is to be moved to the target position and the obtained drive time.

When configured in this manner, the initial power to be used when movement of the object to be transported is caused to commence a next time is corrected in response to a difference between the target drive time and an actual drive time of the motor. For this reason, for example in the case where the drive time of the motor has exceeded the target drive time by the specific time and the commencement of driving of the motor is poor (slow), the initial power can be corrected so as to eliminate the poorness of the commencement of driving. Furthermore, by carrying out correction of the initial power and aiming to make the initial power more suitable, it is possible to eliminate the problem of accumulating so-called dark current. And this makes it possible to improve the image quality for reading originals.

Furthermore, in this motor controlling method, it is preferable that obtaining the position includes obtaining a position of an object to be transported by the motor based on a change in a rising edge and a change in a falling edge of the outputted signal.

When configured in this manner, it is possible to very accurately calculate the transport amount each time an edge between a high level and a low level in the output signal is detected.

A motor controlling method, including:
  causing rotation of a motor to commence by applying an initial power that can cause movement of an object to be transported to commence, to the motor;
  measuring a drive time of the motor until the object to be transported is moved to a target position; and
  correcting the initial power to be used when movement of the object to be transported is caused to commence a next time, in response to a difference between a target drive time of when the object to be transported is to be moved to the target position and the obtained drive time.

When configured in this manner, the initial power to be used when movement of the object to be transported is caused to commence a next time is corrected in response to a difference between the target drive time and an actual drive time of the motor. For this reason, for example in the case where the drive time of the motor has exceeded the target drive time by the specific time and the commencement of driving of the motor is poor (slow), the initial power can be corrected so as to eliminate the poorness of the commencement of driving. Furthermore, by carrying out correction of the initial power and aiming to make the initial power more suitable, it is possible to eliminate the problem of accumulating so-called dark current. And this makes it possible to improve the image quality for reading originals.

Furthermore, in this motor controlling method, it is preferable that the motor is a DC motor. When configured in this manner, it is possible keep generation of noise lower than a case such as using a stepping motor.

A motor controlling device, including:
  a controlling section that causes rotation of the motor to commence by applying an initial power that can cause movement of an object to be transported to commence to a motor;
  a position calculating section that obtains a position of the object to be transported based on a signal outputted in response to the rotation of the motor, wherein the position calculating section obtains a position of the object to be transported after the motor has been controlled so as to cause the object to be transported to move to a target position; and
  a correcting section that corrects the initial power to be used when movement of the object to be transported is caused to commence a next time in response to a difference between the target position and the obtained position of the object to be transported.

When configured in this manner, the initial power to be used when movement of the object to be transported is caused to commence a next time is corrected in response to a difference between the target position and an obtained position of the object to be transported. Thus, for example, when the position of the object to be transported has exceeded the target position by a specific amount or more and has gone too far (position overshooting condition), it is possible to correct the initial power so as to eliminate the position overshooting condition. Furthermore, by carrying out correction of the initial power and aiming to make the initial power more suitable, it is possible to improve the image quality in reading originals.

A motor controlling device, including:
  a controlling section that causes rotation of the motor to commence by applying an initial power that can cause movement of an object to be transported to commence, to a motor;
  a time measuring section that, when a motor is to be controlled so as to cause an object to be transported to move to a target position, measures a drive time of the motor until the object to be transported is moved to the target position; and
  a correcting section that corrects the initial power to be used when movement of the object to be transported is caused to commence a next time, in response to a difference between a target drive time of when the object to be transported is to be moved to the target position and the obtained drive time.

When configured in this manner, the initial power to be used when movement of the object to be transported is caused to commence a next time is corrected in response to a difference between the target drive time and an actual drive time of the motor. For this reason, for example in the case where the drive time of the motor has exceeded the target drive time by the specific time and the commencement of driving of the motor is poor (slow), the initial power can be corrected so as to eliminate the poorness of the commencement of driving. Furthermore, by carrying out correction of the initial power and aiming to make the initial power more suitable, it is possible to eliminate the problem of accumulating so-called dark current. And this makes it possible to improve the image quality for reading originals.

An original reading apparatus, including:
  a controlling section that causes rotation of the motor to commence by applying an initial power that can cause movement of an object to be transported to commence, to a motor;
  a position calculating section that obtains a position of the object to be transported based on a signal outputted in response to rotation of the motor, wherein the position calculating section obtains a position of the object to be transported after the motor has been controlled so as to cause the object to be transported to move to a target position;
  a correcting section that corrects the initial power to be used when movement of the object to be transported is caused to commence a next time in response to a difference between the target position and the obtained position of the object to be transported;
  a motor controlled by the controlling section; and
  an object to be transported whose original reading position is moved by the motor.

When configured in this manner, a condition in which initial driving of a motor in an original reading apparatus results in exceeding the target position (a position overshooting condition) can be effectively eliminated. Furthermore, it is possible to eliminate poor commencement of driving involving the drive time in the initial driving of the motor being too long. For this reason, it is possible to eliminate problems such as the so-called jaggy phenomenon and color irregularities.

A storage medium having a program stored thereon, including:
  a code causing rotation of the motor to commence by applying an initial power that can cause movement of an object to be transported to commence, to a motor;
  a code for obtaining a position of the object to be transported after the motor has been controlled so as to cause the object to be transported to move to a target position based on a signal outputted in response to the rotation of the motor; and
  a code for correcting an initial power to be used when movement of the object to be transported is caused to commence a next time in response to a difference between the target position and the obtained position of the object to be transported.

When configured in this manner, the initial power to be used when movement of the object to be transported is caused to commence a next time is corrected in response to a difference between the target position and an obtained position of the object to be transported. Thus, for example, when the position of the object to be transported has exceeded the target position by a specific amount or more and has gone too far (position overshooting condition), it is possible to correct the initial power so as to eliminate the position overshooting condition. Furthermore, by carrying out correction of the initial power and aiming to make the initial power more suitable, it is possible to improve the image quality in reading originals.

A storage medium having a program stored thereon, including:
  a code for causing rotation of the motor to commence by applying an initial power that can cause movement of an object to be transported to commence, to a motor;
  a code for measuring a drive time of the motor until the object to be transported is moved to a target position; and
  a code for correcting the initial power to be used when movement of the object to be transported is caused to commence a next time, in response to a difference between a target drive time of when the object to be transported is to be moved to the target position and the obtained drive time.

When configured in this manner, the initial power to be used when movement of the object to be transported is caused to commence a next time is corrected in response to a difference between the target drive time and an actual drive time of the motor. For this reason, for example in the case where the drive time of the motor has exceeded the target drive time by the specific time and the commencement of driving of the motor is poor (slow), the initial power can be corrected so as to eliminate the poorness of the commencement of driving. Furthermore, by carrying out correction of the initial power and aiming to make the initial power more suitable, it is possible to eliminate the problem of accumulating so-called dark current. And this makes it possible to improve the image quality for reading originals.

Hereinafter, an embodiment of the present invention is described with reference to FIG. 1 through FIG. 10.

Overall Outline Configuration

FIG. 1 shows a configuration of an original reading apparatus 10 according to one embodiment. The original reading apparatus 10 shown in FIG. 1 is a flatbed scanner in which an original placed on a transparent contact glass 11 is read through the contact glass 11 by the scanning of an image sensor 20.

The image sensor 20 shown in FIG. 1 is a CIS (contact image sensor) system image sensor and is provided with light-receiving elements (CCDs: charge coupled devices)

arranged in a main scanning direction, which is a lengthwise direction, having a predetermined pixel density, a lens corresponding to the light-receiving elements, and an exposure lamp that irradiates light of the three colors RGB respectively onto an original. The light-receiving elements receive reflected light from the original at predetermined periods then generate and accumulate charges corresponding to the amount of light received, and these are outputted as electrical signals.

Furthermore, the image sensor 20 is secured to a carriage 30, which serves as a transport object and is movable along a guide rail 31 in a sub-scanning direction, which is perpendicular to the main scanning direction and is secured in one location to a circular timing belt 40.

Furthermore, a motor 50 causes the image sensor 20 to move along the sub-scanning direction. In the present embodiment, the motor 50 is a DC motor. A worm gear 60 is secured to a shaft 51 of the motor 50 and a spur gear 70 engages with the worm gear 60. Further still, a pulley 71 is secured to the same shaft as the spur gear 70 and rotates by the same rotation amount as the spur gear 70. A pulley 72 is installed so as to readily rotate, and the timing belt 40 is arranged around outer sides of the pulley 71 and the pulley 72 so as to produce a suitable tensile force. With a configuration having such a drive system, the motor 50 transports the carriage 30 in the sub-scanning direction by applying a rotational force to the timing belt 40 via the worm gear 60, the spur gear 70, and the pulley 71 such that the timing belt 40 is caused to rotate around the pulley 71 and the pulley 72.

On the other hand, a disc 52 has a predetermined number of slits formed along its radial direction at a predetermined angular interval in the circumferential direction, and is secured to the shaft 51 of the motor 50 in a manner that is perpendicular to and centered on the shaft 51 so as to rotate with the shaft 51.

Furthermore, a photo interrupter 80 has a light-emitting diode 81 and a photodiode 82, and of the light emitted from the light-emitting diode 81, the light that has passed through a slit of the disc 52 is received by the photodiode 82, and an electrical signal corresponding to the amount of light received is outputted. That is, an output signal (ENC signal) of the photo interrupter 80 is high level only when light has passed through a slit of the disc 52 and is low level when light has been blocked by a portion of the disc 52 other than the slits. Accordingly, when the motor 50 rotates, the ENC signals are in a pulse form and the number of pulses is proportional to the rotational angle or the number of rotations of the motor 50. For this reason, the rotation amount of the motor 50 can be obtained by measuring the number of pulses of output signals of the photo interrupter 80.

It should be noted that in the present embodiment the photo interrupter 80 has two groups of the light-emitting diode 81 and the photodiode 82 and corresponds to a portion of a position detection means. The two photodiodes 82 are arranged so the phase differences of their respective ENC signals are a predetermined angle (90 degrees for example). Furthermore, the disc 52 and the photo interrupter 80 constitute a rotary encoder.

Furthermore, a control circuit 100 is a circuit that controls operations of the image sensor 20 and the motor 50 based on signals from the photo interrupter 80 so as to execute reading operations and also outputs image data obtained in the reading operations. It should be noted that the control circuit 100 outputs this image data to an external device such as a personal computer or a storage device (a memory card, a hard disk drive or the like) that is provided inside or outside the apparatus.

Furthermore, the control circuit 100 corresponds to a portion of the position detection means (mainly a position calculating section 122), a stopping position determination means (mainly a stopping position determination function 111a of a determinating section 111), a drive time measuring means (mainly a timer count function 111c), a drive time determination means (mainly a drive time determination function 111b of the determinating section 111), an initial power correction means (mainly the aforementioned stopping position determination function 111a and the drive time determination function 111b as well as a duty calculating section 112), and a power application control means (mainly the duty calculating section 112 and a motor controlling section 125 and the like).

Figure 2:
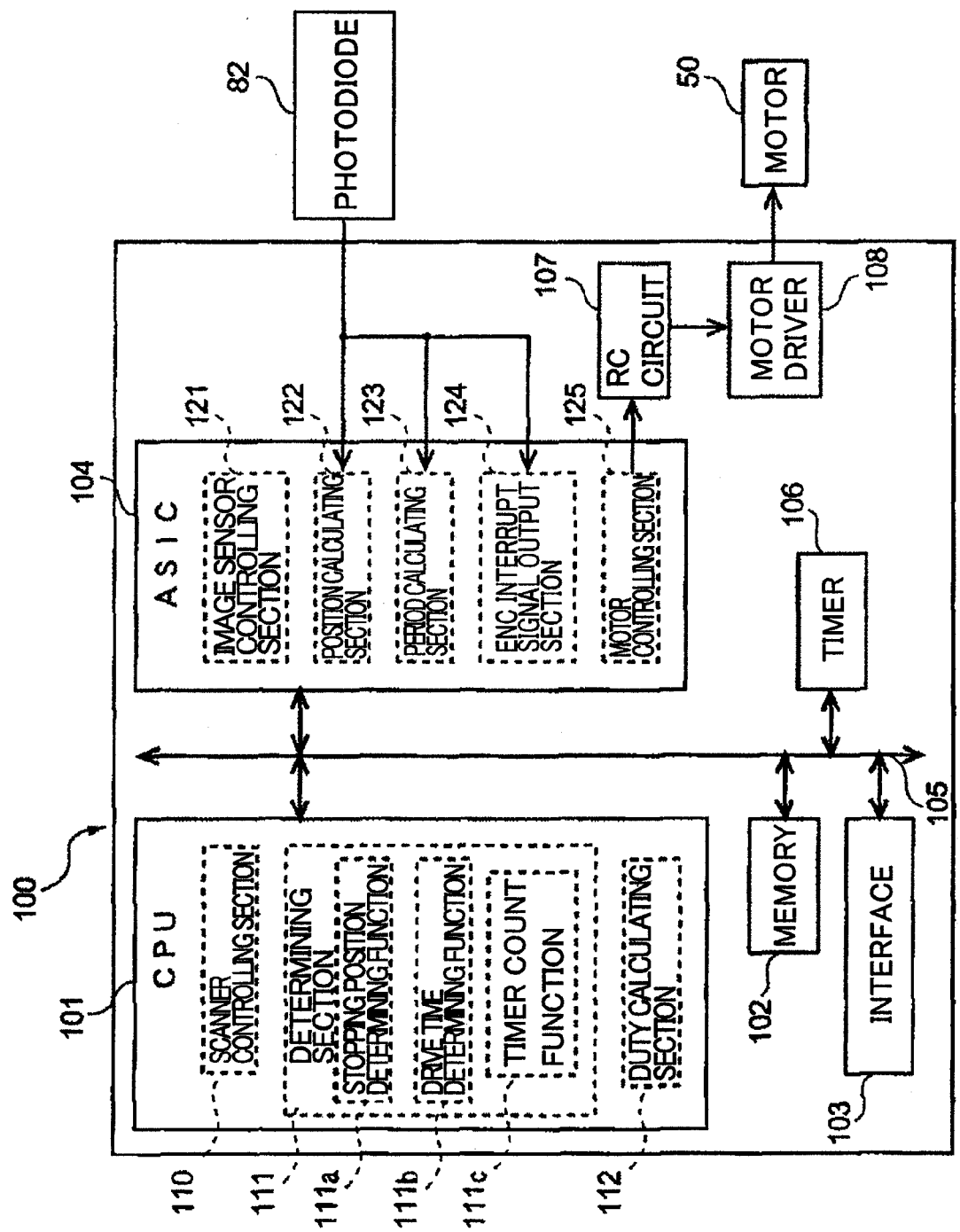
FIG. 2 is a block diagram showing a configuration of a control circuit.

FIG. 2 is a block diagram showing a configuration of the control circuit 100 in FIG. 1. The control circuit 100 has a CPU (central processing unit) 101, a memory 102, an interface 103, an ASIC (application specific integrated circuit) 104, a bus 105, a timer 106, an RC circuit 107, and a motor driver 108.

The CPU 101 operates in accordance with a control program stored in the memory 102. The memory 102 has a RAM and a ROM, and the control program is stored in advance on the ROM. A scanner controlling section 110, the determinating section 111, and the duty calculating section 112 are realized due to execution of the control program by the CPU 101.

Furthermore, a target information table and a target time table are stored in the memory 102. Of these, the target information table stores information (a position information table) relating to positions for obtaining each pixel data in the sub-scanning direction. It should be noted that this information (the position table) is determined on one-to-one basis with respect to the resolution for original reading. Furthermore, the resolution for original reading does not vary across an entire area extending from one edge side to another edge side in the sub-scanning direction, and therefore the pitch for obtaining each pixel data is equivalent. Furthermore, the target time information is stored in the memory 102. The target time information involves target times for original reading corresponding to the resolution for original reading.

Furthermore, the scanner controlling section 110 carries out communications with external devices, commencement of original reading operations, and control in response to operation by a user at an unshown operation section, etc.

Furthermore, a timer interrupt signal from the timer 106, a signal (position detection signal) relating to position information from the position calculating section 122, a signal (period detection signal) relating to period information from a period calculating section 123, and an ENC interrupt signal from an ENC interrupt signal output section 124 are inputted to the determinating section 111.

The determinating section 111 is provided with the stopping position determination function 111a, the drive time determination function 111b, and the timer count function 111c. Of these, the stopping position determination function 111a compares target position information that is present in the position information table (the preceding target position, which is not a new (latest) target position but rather a (preceding) target stopping position used as an intended target for the stopping position where the carriage 30 is currently stopping) and a current position of the carriage 30 (which corresponds to the current position and it should be noted that in most cases this is the stopping position at which the carriage 30 is stopping). And it calculates a difference (edge number n) between the current position of the carriage 30 and the above-mentioned target position. Then it determines whether or not the edge number n of the difference is greater than a predetermined amount. And when it is determined to be greater than the predetermined amount in this determination, then a hold duty magnification correction directive is outputted to the duty calculating section 112.

It should be noted that the current position and the target position of the carriage 30 are calculated by counting the edges of ENC signals. Thus, the above-mentioned edge number n difference is also a difference of the edge number of ENC signals. Furthermore, "predetermined amount" refers to an amount (edge number) of overshoot that is allowable without carrying out correction.

Furthermore, the drive time determination function 111b determines a magnitude between the drive time of the motor 50 (which corresponds to the drive time) and a drive time set as a target for that time (target drive time). And when it is determined in this determination that the drive time is greater than the target drive time, then a hold duty magnification correction directive is outputted to the duty calculating section 112. Furthermore, information relating to the drive time (drive time information) is also outputted to the duty calculating section 112.

Furthermore, the timer count function 111c calculates the drive times by counting the timer interrupt signals that are sent from the timer 106. Here, "drive time" is a time from commencement of driving the motor 50 by an amount of one step corresponding to data of a single pixel in original reading until the reading of that one step amount is completed. It should be noted that as a general rule the motor 50 stops when reading finishes, but it does not necessarily always stop and may continue moving slightly due to inertia. And the drive time that has been calculated is outputted to the above-mentioned drive time determination function 111b. Also, due to its relationship to an already measured drive time, the drive time in the present embodiment is a drive time for one step of the preceding reading, and the target time is the time that was set as the target for the one step of the preceding reading.

Furthermore, based on the ENC interrupt signal, the above-mentioned determinating section 111 compares a period T relating to period information (which corresponds to a measured period) and a target period To (which corresponds to a reference period) for ultra low speed control (BS control), which is described later. Then, when the period T is smaller than the target period To, the determinating section 111 carries out a process in which a duty ratio is lowered to a hold current value (which corresponds to standby power).

It should be noted that the hold current drives the motor 50 for example at a time of activation or another predetermined timing, and is determined at that time by measuring (carrying out a measurement) of the duty when a predetermined rotation speed is achieved. When carrying out this measurement, rather than only measuring the duty when the predetermined rotation speed is achieved, the rotation speed when the motor 50 is driven at a predetermined duty may be measured.

Furthermore, in the present embodiment, the hold current is determined by carrying out this measurement. The hold current is determined by multiplying a predetermined magnification (hold duty magnification) by a prescribed (fixed value) hold duty (corresponding to a prescribed hold value). It should be noted that the hold duty magnification is expressed as Y/X in which X is a fixed value and Y is a variable. And the hold current is determined by varying Y in response to a result of the measurement.

Furthermore, when instructed by the scanner controlling section 110 to execute ultra low speed control (BS control), which is described later, the duty calculating section 112 executes calculations for ultra low speed control (BS control).

Also, in the ultra low speed control (BS control), the duty calculating section 112 adds a predetermined duty (step duty) each time a timer interrupt signal is received from the timer 106.

Furthermore, the duty calculating section 112 receives correction directives from the stopping position determination function 111a. And along with the correction directives, it also receives information relating to the edge number n of the above-mentioned difference from the stopping position determination function 111a. Then, based on the information relating to the edge number n of the difference, the duty calculating section 112 calculates a correction amount A. It should be noted that the correction amount A is determined in response to a magnitude of the edge number n of the difference as shown in FIG. 7 which is described later.

Furthermore, the duty calculating section 112 receives correction directives from the drive time determination function 111b. And along with these correction directives, the duty calculating section 112 also receives the above-mentioned information relating to the drive time (drive time information). Then, based on the drive time information, the duty calculating section 112 calculates a correction amount B.

Figures 6, 7:
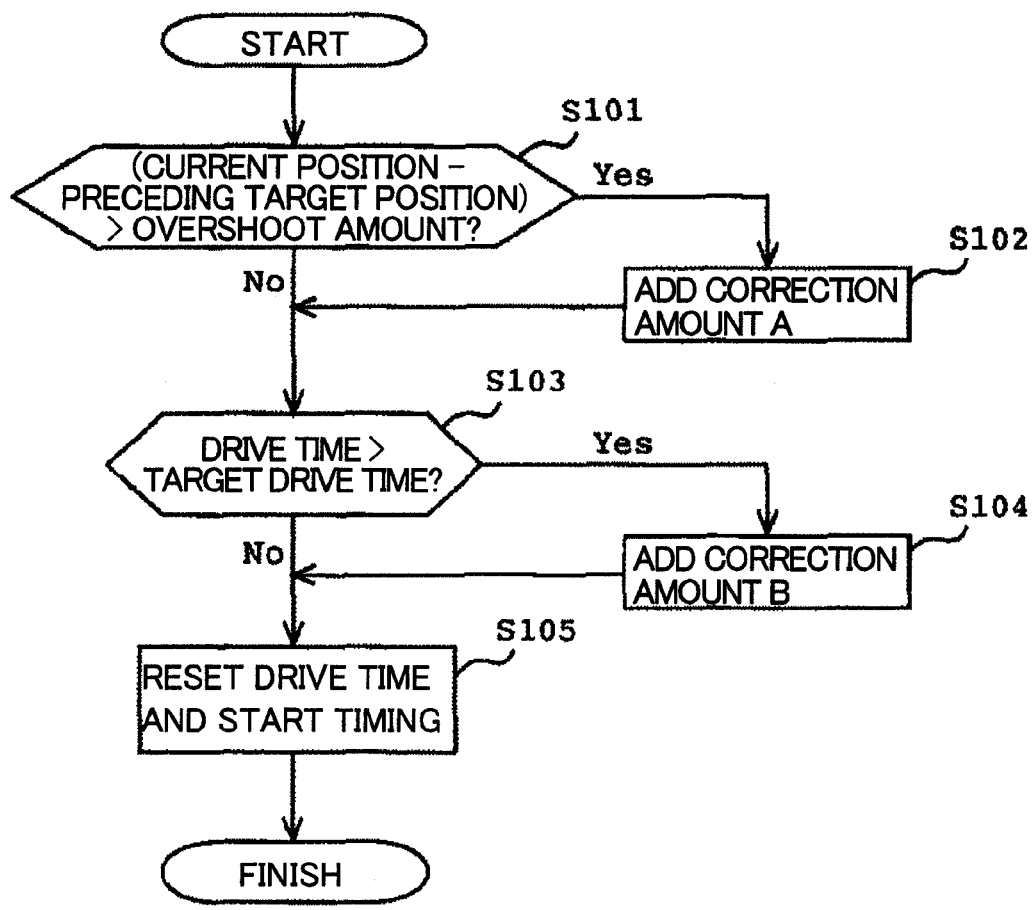
FIG. 6 is an operation flow showing details of an overshoot correction process in FIG. 5.
FIG. 7 shows one form of correction amounts A.
Figures 8, 9:
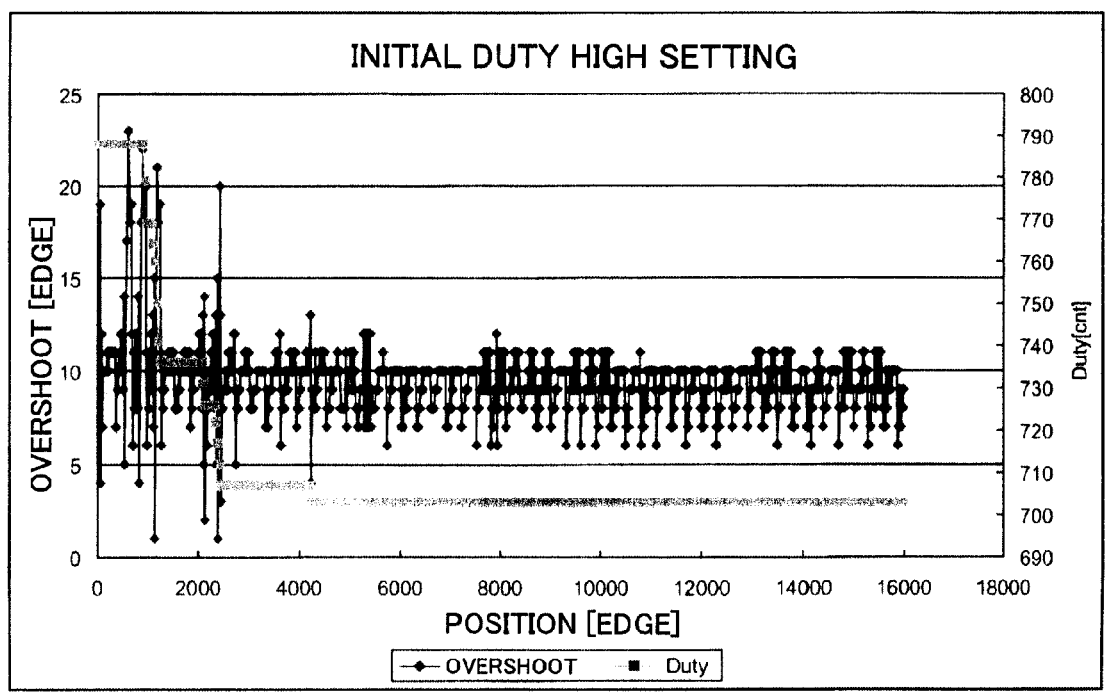
FIG. 8 shows one form of correction amounts B.
FIG. 9 is a diagram for describing elimination of a position overshooting condition.

Here, FIG. 7 and FIG. 8 show examples of the correction amount A and the correction amount B. As shown in FIG. 7, the correction amount A is set to change incrementally in response to the magnitude of the edge number n of the difference. Furthermore, the correction amount B is also set to change incrementally in response to the magnitude of the drive time information.

Furthermore, the interface 103 has an interface circuit such as a USB (universal serial bus) for carrying out data communications with external devices, and an interface circuit for carrying out data communications with a memory card slot or the like provided within the apparatus. The ASIC 104 has an image sensor controlling section 121, the position calculating section 122, the period calculating section 123, the ENC interrupt signal output section 124, and the motor controlling section 125.

In the ASIC 104, the image sensor controlling section 121 controls the image sensor 20 to carry out reading operations for each of the colors RGB, and obtains image data that has been read for each color. The position calculating section 122 calculates the current position of the carriage 30 by counting the number of pulses of ENC signals outputted from the photodiodes 82. Furthermore, the period calculating section 123 measures the period between edges of the ENC signals and calculates the current speed of the carriage 30 based on the period measurement.

Furthermore, upon receiving an ENC signal from the photodiodes 82, the ENC interrupt signal output section 124 outputs an ENC interrupt signal based on the ENC signal to the CPU 101. Then, upon receiving this ENC interrupt signal, determinating section 111, which is realized by the CPU 101, carries out processing such as comparing the period T and the target period To as mentioned earlier. It should be noted that the ENC interrupt signal output section 124 outputs ENC interrupt signals for all the edges outputted from the photodiodes 82. That is to say, the ENC interrupt signal output section 124 outputs an ENC interrupt signal each time a rising edge or falling edge of an A-phase ENC signal or a rising edge or falling edge of a B-phase ENC signal is detected.

Furthermore, based on the control directives from the CPU 101 (duty calculating section 112), the motor controlling section 125 outputs control signals for controlling the motor 50 in synchronization with the timing pulses outputted from the image sensor controlling section 121. In the present embodiment, the motor controlling section 125 outputs PWM (pulse width modulation) signals of a duty ratio corresponding to the rotation amount of the motor 50.

Furthermore, the timer 106 performs measurements by counting unshown clock signals. Then, when a preset time is reached according to this counting, it outputs a timer interrupt signal to the CPU 101.

Figure 3:
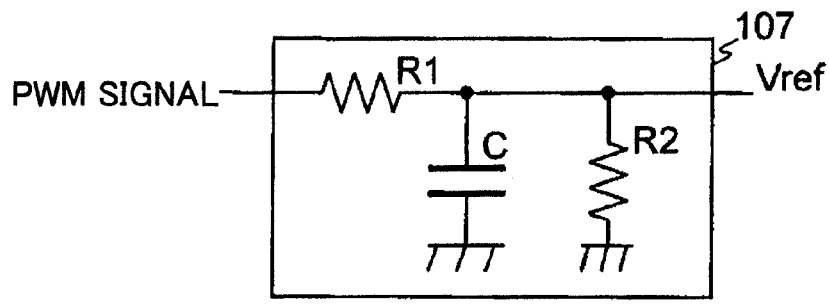
FIG. 3 is a circuit diagram showing an example of an RC circuit in FIG. 2.

Furthermore, the RC circuit 107 is a low pass filter circuit, and is a circuit for changing the output voltage to a direct current voltage corresponding to the duty ratio of the inputted PWM signals. FIG. 3 is a circuit diagram showing an example of the RC circuit 107 in FIG. 2. As shown in FIG. 3, the RC circuit 107 is a circuit in which voltage dividing is performed by a resistor R1 and a resistor R2 and smoothing is performed by a capacitor C. In this embodiment, the output voltage of the RC circuit 107 is a voltage value proportional to the duty ratio of the inputted PWM signals.

Furthermore, the motor driver 108 is a driver circuit that conducts to the motor 50 an electrical current corresponding to a current value directive voltage Vref, which is applied from the motor controlling section 125 via the RC circuit 107. In the present embodiment, an electrical current proportional to a value of the current value directive voltage Vref is conducted to the motor 50.

Figure 4:
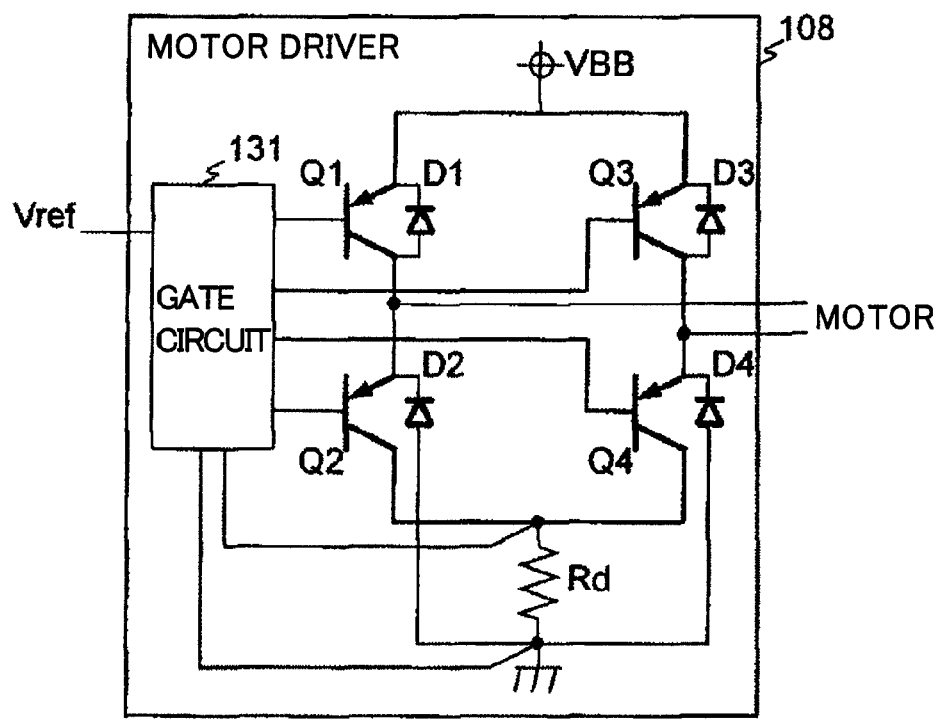
FIG. 4 shows an example of a motor driver in FIG. 2.

FIG. 4 shows an example of the motor driver 108 in FIG. 2. Switching elements Q1 to Q4 are bridge connected, and are switching transistors, and diodes D1 to D4 are arranged between a collector and an emitter (between a gate and a drain) respectively of the switching elements Q1 to Q4 and are regenerative diodes for conducting current in a reverse direction to the current conducted in the switching elements Q1 to Q4. A resistor Rd is a microscopic resistor that detects a current value flowing to the motor 50 as a double ended voltage. A gate circuit 131 is a circuit for carrying out on-off control of the switching elements Q1 to Q4 based on the value of the current value directive voltage Vref and the value of the drive current of the motor 50 obtained from the double ended voltage of the resistor Rd. It should be noted that in the present embodiment, the switching elements Q1 to Q4 are P-type transistors respectively, but N-type transistors may be used. In this case, the resistor Rd is provided on a power source VBB side.

For example, when the switching elements Q1 and Q4 are ON and the switching elements Q2 and Q3 are OFF, the power source voltage VBB is applied to the motor 50 (and the microscopic resistor Rd for detecting current) such that the motor 50 rotates in a forward direction. Furthermore, when the switching elements Q2 and Q3 are ON and the switching elements Q1 and Q4 are OFF, the power source voltage VBB is reversed and applied to the motor 50 (and the microscopic resistor Rd for detecting current) such that the motor 50 rotates in a reverse direction. In the case where the switching elements Q1 and Q4 are ON and the switching elements Q2 and Q3 are OFF, when the drive current of the motor 50 becomes equal to or greater than a value indicated by the current value directive voltage Vref, the gate circuit 131 turns off the switching element Q1 for a fixed time, thereby causing the motor driver 108 to perform a regeneration operation, after which the switching element Q1 is turned on.

By repeating this operation, the drive current of the motor 50 is maintained substantially at the value indicated by the current value directive voltage Vref. In this case, the switching elements Q2 and Q3 continue to stay OFF. Similarly, in the case where the switching elements Q2 and Q3 are ON and the switching elements Q1 and Q4 are OFF, when the drive current of the motor 50 becomes equal to or greater than a value indicated by the current value directive voltage Vref, the gate circuit 131 turns off the switching element Q2 for a fixed time, thereby causing the motor driver 108 to perform a regeneration operation, after which the switching element Q2 is turned on. By repeating this operation, the drive current of the motor 50 is maintained substantially at the value indicated by the current value directive voltage Vref. In this case, the switching elements Q2 and Q3 continue to stay OFF.

Regarding Motor Drive Control

Figure 5:
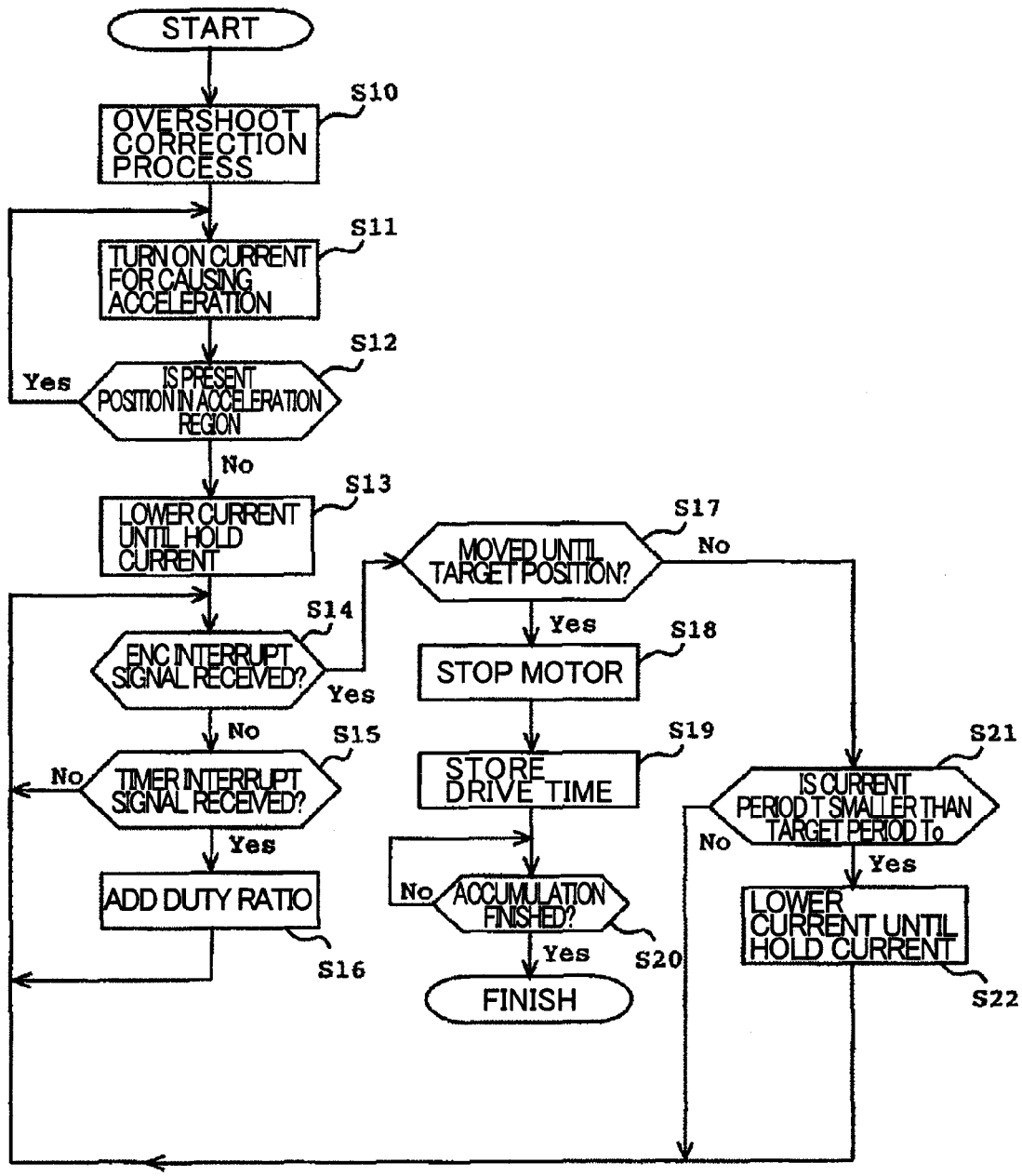
FIG. 5 shows an operation flow when motor driving commences.

Next, description is given with reference to drawings including the operation flow chart in FIG. 5 regarding carrying out motor control in the original reading apparatus 10 configured as described above.

When a user places an original targeted for reading on the contact glass 11 and high resolution reading mode is set due to an operation on an operation panel for example of the original reading apparatus 10, the original reading apparatus 10 commences activation of ultra low speed control corresponding to the high resolution reading mode. At this time, the original reading apparatus 10 executes an overshoot correction process (S10) that is described later. It should be noted that details of this overshoot correction process are described later based on FIG. 6.

After the above-mentioned overshoot correction process is finished, turning on a current for acceleration is commenced in the motor 50 due to a directive of the determinating section 111 (S11). Due to the commencement of turning on the current for acceleration, ultra low speed control (BS control) commences. Furthermore, in turning on the current, due to a directive from the determinating section 111, the duty calculating section 112 multiplies the hold duty magnification, which is obtained from the memory 102 according to the preceding measurement, by the hold duty, which is a fixed value. Furthermore, a predetermined activation duty is added to the hold duty. Then, a current corresponding to the sum of the hold duty and the activation duty (which is an initial duty and it should be noted that this initial duty corresponds to the initial power) is applied to the motor 50 via the ASIC 104 and the driver 108.

Furthermore, in turning on the current for acceleration in ultra low speed control (BS control), activation of the motor 50 is commenced and is carried out from after an A-phase rising edge for example is detected (at this time, an ENC interrupt signal is inputted to the CPU 101), until a predetermined number (one or more) same A-phase falling edges are detected.

Following this, a determination is made as to whether or not the current position of the carriage 30 is present in an acceleration region (S12). This determination is carried out by determining whether or not a predetermined number of edges have been detected. And when the current position of the carriage 30 is determined to be not present in the acceleration region (when "No") in determination of S12, then the current is reduced until the above-mentioned hold current (S13). At this time, the hold duty magnification uses an initial value stored in the memory 102 and in which a measurement result or the like is reflected.

Furthermore, after reducing the current to the hold current, the determinating section 111 determines whether or not a next ENC interrupt signal has been received (S14).

It should be noted that when it is "Yes" at S12 (when the current position is present in the acceleration region), the procedure returns to the preceding S11 again and processing continues.

When it is determined in the determination of S14 that an ENC interrupt signal has not been received (when "No"), then following this the determinating section 111 determines whether or not a timer interrupt signal has been received from the timer 106 (S15). When it is determined in this determination that a timer interrupt signal has not been received (when "No"), the procedure returns to the above-mentioned S14.

Furthermore, when it is determined at S15 that a timer interrupt signal has been received (when "Yes"), the duty calculating section 112 adds the predetermined duty (S16). Here, the predetermined duty that is added refers to a duty ratio that is added incrementally to the hold current, and the duty ratio that is added at each increment is equivalent.

It should be noted that the voltage corresponding to the duty ratio is actually converted to a current (direct current) that has undergone predetermined division and smoothing through the RC circuit 107 shown in FIG. 3. At this time, when the duty ratio is incrementally added, the current also becomes incrementally added. Furthermore, the timer interrupt signal transmitted from the timer 106 is transmitted at a smaller time interval than the ENC interrupt signal that is transmitted from the ENC interrupt signal output section 124.

When it is determined in the determination of S14 that an ENC interrupt signal has been received (when "Yes"), then following this a determination as to whether or not the carriage 30 has moved until the target position (whether or not the counted number of ENC signals has reached a targeted count number) is carried out (S17). When it is determined in the determination of S17 that the carriage 30 has reached the target position (when "Yes"), then following this the motor 50 is caused to stop (S18).

And after the stopping of the motor 50, the drive time of the motor 50 is stored in an unshown register or the memory 102 or the like (S19). It should be noted that the count number that is counted by the timer count function 111c corresponds to the drive time, and therefore when the drive time is stored in the register or the like, this count number may also be stored.

Furthermore, after storing the drive time, a determination is performed as to whether or not charge accumulation in the image sensor 20 has finished (S20). That is, when movement to the target position occurs in a state where the motor 50 is rotating faster than expected, the charge accumulation time of the image sensor 20 will be insufficient upon reaching the target position. For this reason, in this case, charge accumulation by the image sensor 20 is caused to continue until the prescribed accumulation time is reached (this corresponds to when it is "No" at S20). It should be noted that when the prescribed accumulation time is reached, a one step amount operation of the motor 50 is finished.

Furthermore, when it is determined in the above-mentioned S17 that the carriage 30 has not moved until the target position (when "No"), then it is necessary to cause the carriage 30 to move further toward the target position. Thus, in this case, ultra low speed control continues. As a specific process of S17 onward, a determination is made as to whether or not the current period T is small compared to the target period To (S21). It should be noted that the periods are inverse numbers to the speeds and therefore in this determination it is also possible to compare the current speed and the target speed.

When it is determined in S21 that the period T is smaller than the target speed To (when determined "Yes"), the speed of carriage 30 between two neighboring edges is faster than the targeted speed. Thus, in this case, the duty calculating section 112 carries out a process (calculation) of reducing the duty ratio until the duty ratio corresponding to the hold current (S22). And after the process of S22 is finished, the procedure again returns to S14.

Furthermore, when it is determined in the determination of S21 that the period T is greater than the target speed To (when determined "No"), the speed of carriage 30 between two neighboring edges is slower than the targeted speed. In this slow condition, reducing the duty ratio to a duty ratio corresponding to the hold current as shown in S22 causes reduced throughput for reading an original. Consequently, in this case (when determined "No" at S21), the procedure returns to S14 again without carrying out the process of S22 (without reducing the current to the hold current), and a determination is made as to whether or not a next ENC interrupt signal has been received. Ultra low speed control of the motor 50 is achieved by executing the above-described processing flow.

Details of Overshoot Correction Process

Next, details of the overshoot correction process in the above-described S10 are described based on FIG. 6.

In the overshoot correction process, first the stopping position determination function 111a calculates the edge number n of the difference between the current position of the carriage 30 and the preceding target position, and then determines whether or not this edge number n of the difference is greater than a predetermined overshoot amount (S101).

When it is determined in the determination of S101 that the edge number n of the difference is greater than the predetermined overshoot amount (when "Yes"), this corresponds to a state in which the overshoot amount has exceeded an allowed range and correction is necessary. That is, the carriage 30 has gone past the target position and it is conceivable that the current corresponding to the initial duty (=hold duty+activation duty) applied to the motor 50 is too large. For this reason, following from when it is "Yes" at S101, the correction amount A is added to the Y value in the hold duty magnification Y/X (S102). Namely, when Y1=Y+A, the new hold duty magnification is Y1/X.

It should be noted that description is given relating to the correction amount A based on FIG. 7. As shown in FIG. 7, the correction amount A is determined in response to the edge number n of ENC signals of the overshoot amount. That is, in ultra low speed control, when a mode 2 for example is selected corresponding to a resolution or the like, the correction amount A is 0 when the edge number n is a2 or less. However, when the edge number is in the range of $a2<n\leq a3$, then the correction amount A is −1 (at this time, Y1=Y−1), when the edge number is in the range of $a3<n\leq a4$, then the correction amount A is −2 (at this time, Y1=Y−2), when the edge number is in the range of $a4<n\leq a5$, then the correction amount A is −3 (at this time, Y1=Y−3), and when the edge number is in the range of $a5<n$, then the correction amount A is −4 (at this time, Y1=Y−4).

In this way, when the edge number n (that is, the current position of the carriage 30) goes past the target position and there is an overshoot condition (position overshooting condition), the correction amount A takes a negative value. Thus, the new hold duty magnification obtained by adding the correction amount A is smaller than the hold duty magnification prior to adding. In this way, when Y1/X, which is the hold duty magnification, becomes smaller, the initial duty also becomes smaller in response to this and it becomes possible to eliminate the position overshooting condition due to the drive of the motor 50.

When it is determined in the determination of S101 that the edge number n of the difference is smaller than the predetermined overshoot amount (when "No") or when the processing of S102 has been carried out, the drive time determination function 111b then determines whether or not the drive time is greater than the target drive time (S103).

When it is determined in the determination of S103 that the drive time is greater than the target drive time (when "Yes"), this corresponds to a state in which the allowed range of time has been exceeded and correction is necessary. That is, the movement of the carriage 30 has become excessively slow and it is conceivable that the current corresponding to the initial duty (=hold duty+activation duty) applied to the motor 50 is too small. For this reason, following from when it is "Yes" at S103, the correction amount B is added to the Y value in the hold duty magnification Y/X (S104). In this case also, when Y1=Y+B, the new hold duty magnification is Y1/X.

It should be noted that description is given relating to the correction amount B based on FIG. 8. As shown in FIG. 8, the correction amount B is determined in response to a drive time t. That is, in ultra low speed control, when a mode 2 for example is selected corresponding to a resolution or the like, the correction amount B is 0 when the drive time t is b2 or less. However, when the edge number is in the range of b2<t≦b3, then the correction amount B is +1 (at this time, Y1=Y+1), when the edge number is in the range of b3<t≦b4, then the correction amount B is +2 (at this time, Y1=Y+2), when the edge number is in the range of b4<t≦b5, then the correction amount B is +3 (at this time, Y1=Y+3), and when the edge number is in the range of b5<t, then the correction amount B is +4 (at this time, Y1=Y+4).

In this way, when the drive time t becomes greater than the target time and is in the drive time overshooting condition, the correction amount B takes a positive value. Thus, the new hold duty magnification obtained by adding the correction amount B is greater than the hold duty magnification prior to adding. In this way, when Y1/X, which is the hold duty magnification, becomes larger, the initial duty also becomes larger in response to this and it becomes possible to eliminate the drive time overshooting condition of the motor 50.

Furthermore, when it is determined in the determination of S103 that the drive time t is smaller than the target drive time (when "No") or when the processing of S104 has been carried out, the timer count function 111c resets the count of the drive time t and newly starts the timing of the drive time t (S105). It should be noted that when the processing of S105 has been carried out, the processing of S11 shown in the above-described FIG. 5 is carried out.

Summary of Embodiment

Hereinafter, the foregoing embodiment is summarized while reconfirming the terms that have been used.

Figure 11:
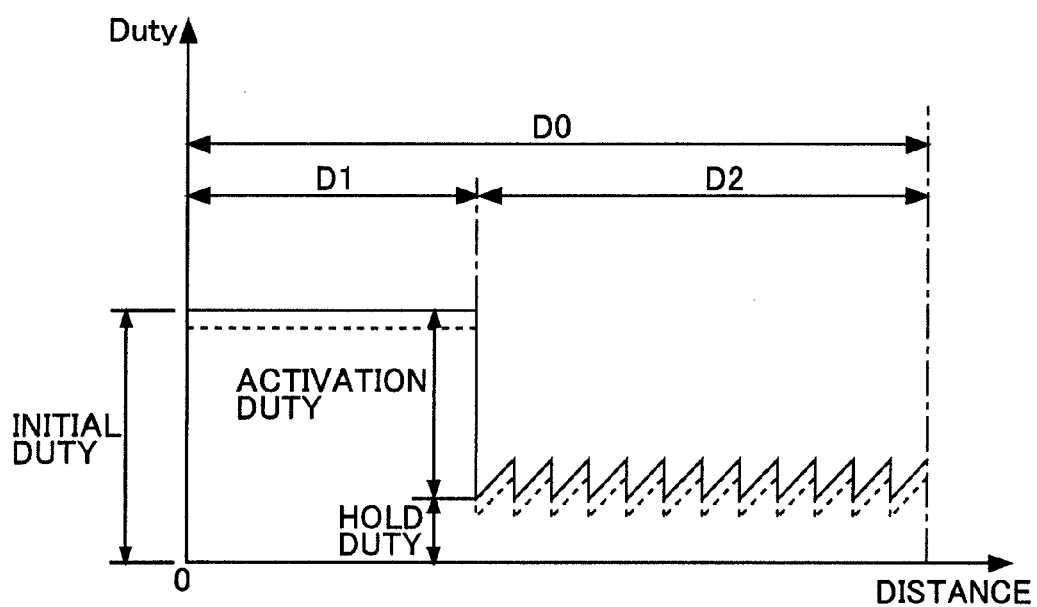
FIG. 11 is a diagram for describing each region in regions of ultra low speed control.

FIG. 11 is a diagram for describing each region in the regions of ultra low speed control. FIG. 11 shows a region D0 in which ultra low speed control is carried out, an acceleration region D1, and a region D2 after the acceleration region. In the foregoing embodiment, there is the acceleration region D1 for control in step S11 to S12 in a region of a first half of the region D0, and the region D2 for control in step S13 to S22 after the completion of the acceleration region.

Furthermore, FIG. 11 shows the initial duty, the hold duty, and the activation duty. The following relationship exists among the initial duty, the hold duty, and the activation duty.

Initial duty=hold duty+activation duty

The initial duty corresponds to the initial power. The activation duty is a predetermined duty value for causing movement of an object to be transported to commence by being added to a duty value (corresponding to the hold duty) that is still unable to cause the object to be transported to start moving even when applied.

Furthermore, in step S102, the hold duty is:

Hold duty=prescribed hold value×(Y+A)/X

The hold duty corresponds to the standby power. The prescribed hold value is the hold duty prior to carrying out correction. It should be noted that the current conducted to the motor when the hold duty is applied is the hold current value.

X is a predetermined fixed value. Y is a motor-specific value that is determined by a measurement result and A is a correction value determined in response to an actual position deviation from the target position. Since X and Y are fixed values, the hold duty is determined according to the correction amount A. And a negative value is set for the correction amount A when the carriage has gone past the target position. Accordingly, when the carriage goes too far, the hold duty is reduced in response to this, and the initial duty is corrected so as to be reduced in the next movement such that a position overshooting condition can be eliminated.

Furthermore, in step S104, the hold duty is:

Hold duty=prescribed hold value×(Y+B)/X

Here also, since X and Y are fixed values, the hold duty is determined according to the correction amount B. And a positive value is set for the correction amount B when the actual drive time has exceeded the target drive time. Accordingly, when the actual drive time is long and the movement speed of the carriage is slow, the hold duty is increased in response to this, and the initial duty is corrected so as to be increased in the next movement such that the drive time overshooting condition can be eliminated.

Regarding the Region After the Acceleration Region

When the acceleration region finishes, a repetition is performed in the region D2 between control in which duty is increased incrementally from the hold duty and control in which the duty is again reduced to the hold duty. Here, the hold duty that is used is also corrected in the above-described overshoot correction process.

Accordingly, when the carriage has gone too far, the hold duty is reduced in the next movement, and therefore control is performed in the region D2 also using a duty by which a position overshooting condition can be eliminated.

Furthermore, when the actual drive time is longer than the target drive time and the movement speed of the carriage is slow, the hold duty is increased in the next movement, and therefore control is performed in the region D2 also using a duty by which a drive time overshooting condition can be eliminated.

Reference is again made to FIG. 11. FIG. 11 shows a duty drawn with a solid line and a duty drawn with a dashed line. The duty drawn with a solid line is the duty to be used in a subsequent control and the duty drawn with a dashed line is the duty that was used in the current control of the motor. Here, for example, the hold duty that was used in the current control was small, and therefore as a result the carriage undesirably moved slower than the target drive time. As a result, a correction in which the hold duty is increased was carried out in the above-described overshoot correction process (S10), and the subsequent duty is shown to be higher overall.

Regarding Measurement

There are individual differences between motors and there are also individual differences among objects to be transported such as carriages which are moved by the motor. For this reason, even in the case where a carriage is to be moved by conducting the same current to motors for example, slight differences occur undesirably between individual scanners in the acceleration and speed when the carriage is caused to move. This is due to factors such that the mass of objects to be transported varies among individual objects and the frictional force produced when the objects to be transported are moved also varies among individual units. Thus, even when the same duty is applied to motors, the carriages move at varying speeds among individuals units.

However, it is desirable that when an initial duty is applied to the motors respectively, the carriages being moved by the respective motors will start moving with the same acceleration and reach the same speed after a predetermined time. Here, the value of Y corresponding to the prescribed hold value is varied among individual scanners and the initial duty is corrected by correcting the hold duty (accordingly, the hold duty and the initial duty are different values among individual units). And when the initial duty is applied to the motor of each scanner, movement is commenced with substantially the same acceleration and a substantially same speed is reached after the predetermined time.

In order to obtain the value of Y, the carriage movement speed is obtained for several duties in each individual scanner. Then, based on a relationship among these, the prescribed hold value is corrected and a measurement is carried out in which the value of Y for obtaining the hold duty is obtained.

Regarding the Acceleration Region

In the foregoing embodiment, the above-described ultra low speed control is carried out in order to cause the carriage to move to and stop at a predetermined position with excellent accuracy. And by causing the carriage to move at slow speed, it is easier to cause it to move to the predetermined position with excellent accuracy.

Of the distance in which the carriage is moved using ultra low speed control, the movement of a predetermined distance in the first half is set as the acceleration region (S11 to S12). And the movement of the remaining distance is performed under the control according to step S13 onward. This involves commencing movement of the carriage in the acceleration region D1 and carrying out fine adjustments of the movement until the target position in the region D2. If all the movement until the target position was carried out without an acceleration region, then the movement until the target position would sometimes be too slow. On the other hand, when all the movement is caused in an acceleration region, the carriage would undesirably go past the target position. Accordingly, by using both of these in a well balanced manner and moreover by correcting the initial duty and the like using the above-described techniques, then the movement accuracy of the carriage is improved.

Effect of the Embodiment

With the thus-configured original reading apparatus 10, when the stopping position determination function 111a determines that the present position has exceeded the target position by a specific amount, the CPU 101 corrects the initial duty that is applied to the motor 50. Then, a corrected initial duty is applied to the motor 50. Thus, when the present position has exceeded the target position by a specific amount or more and has gone too far (position overshooting condition), then the initial duty is corrected so as to eliminate the position overshooting condition. Furthermore, by carrying out correction of the initial duty and aiming to make the initial duty more suitable, it is possible to eliminate the so-called jaggy phenomenon. This makes it possible to improve the image quality for reading originals.

FIG. 9 gives illustration in relation to eliminating this condition of going too far (position overshooting condition). In FIG. 9, the stopping positions (edge numbers) are shown using a zigzag line, and the initial duty is shown using horizontal straight lines. Furthermore, in FIG. 9, the boundary in which correction of the initial duty is not carried out (in terms of the edge number n in FIG. 7, the boundary corresponds to the case where n is 2) has an edge number of 12. As shown in FIG. 9, conspicuous position overshooting is produced where the initial duty is high (early positions). However, the present embodiment is applied and correction of the initial duty is carried out such that in a condition where the initial duty has been reduced, position overshooting does not exceed the boundary and there is a condition in which almost no correction is necessary.

By doing this, when reading a monochrome original where the initial duty tends to be high, the initial duty of the motor 50 is suppressed and suitable driving of the motor 50 can be achieved.

Further still, with the present embodiment, when the drive time determination function 111b determines that the drive time of the motor 50 has exceeded the target drive time by a specific time, the CPU 101 corrects the initial duty that is applied to the motor 50. Then, a corrected initial duty is applied to the motor 50. For this reason, in the case where the drive time of the motor 50 has exceeded the target drive time by the specific time or more and the commencement of driving of the motor 50 is poor (slow), the initial duty can be corrected so as to eliminate the poorness of the commencement of driving. Furthermore, by carrying out correction of the initial duty and aiming to make the initial duty more suitable, it is possible to eliminate the problem of accumulating so-called dark current (a problem where overcharging is produced).

When these matters are combined, the present embodiment makes it possible to prevent occurrences of the so-called jaggy phenomenon produced by position overshooting due to the commencement of driving of the motor 50 being too great, and also makes it possible to prevent occurrences of color irregularities and the like caused by poor driving commencement, or the motor 50 being slow. This makes it possible to even further improve the image quality for reading originals.

Figure 10:
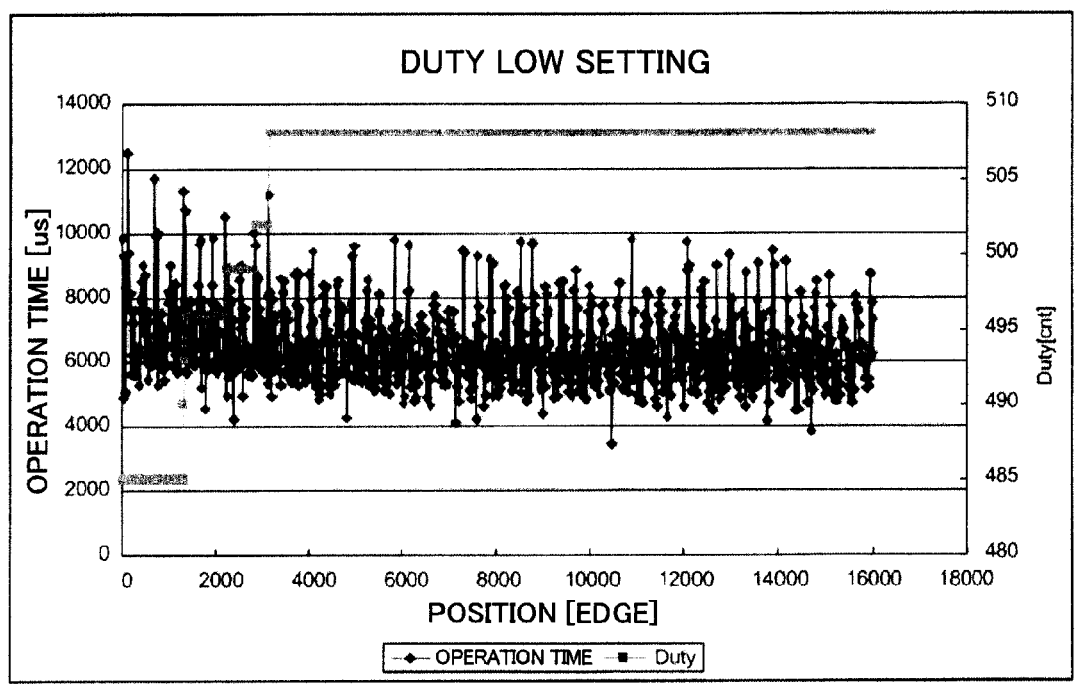
FIG. 10 is a diagram for describing elimination of a drive time overshooting condition.

It should be noted that FIG. 10 gives illustration in relation to eliminating the condition of poor driving commencement (a condition in which overshooting occurs in the drive time, that is, the drive time overshooting condition). In FIG. 10, the overshooting drive time (operation time) is shown using a zigzag line, and the initial duty is shown using horizontal straight lines. Furthermore, in FIG. 10, the boundary in which correction of the initial duty is not carried out (the boundary corresponds to the case where t is b2, in terms of the drive time t in FIG. 8), has an operation time of 10,000 (μs). As shown in FIG. 10, conspicuous overshooting in drive times is produced where the initial duty is high (early positions). However, the present embodiment is applied and correction of the initial duty is carried out such that in a condition where the initial duty has been reduced, the overshooting in drive times does not exceed the boundary and there is a condition in which almost no correction is necessary.

Furthermore, in the present embodiment, the hold duty in the initial duty is corrected. For this reason, when either the current position or the drive time of the carriage 30 is in an overshoot condition, the amount of position overshooting is reduced by reducing the hold duty, which enables this problem to be eliminated. Here, in the present embodiment, as shown in FIG. 7, correction of the initial duty corresponds to the extent (edge number) the current position exceeds the target position, and the degree of reduction is incrementally changed. Accordingly, the degree of reducing the hold duty is incrementally changed in response to the position overshooting, which enables the position overshooting condition to be effectively eliminated.

Further still, in the present embodiment, the hold current is determined by multiplying Y/X, which is the predetermined hold duty magnification, by the prescribed hold value. Accordingly, by reducing the numerator Y in the hold duty magnification, the position overshooting condition in the initial driving of the motor 50 can be effectively eliminated using fine adjustments.

Furthermore, in the present embodiment, by counting the edges of the ENC signals using the position calculating section 122, it is possible to calculate the movement amount (transport amount) of the carriage 30 by the motor 50 with high accuracy.

Furthermore, in the present embodiment, the motor 50 is a DC motor. For this reason, it is possible keep generation of noise lower than a case such as using a stepping motor.

An embodiment of the present invention was described above, but various modifications can be made to the above-described techniques. Hereinafter, description is given concerning these.

The foregoing embodiment was described using a DC motor as an example of the motor 50. However, the motor is not limited to a DC motor and in a case for example where noise is not a significant problem, a stepping motor may be used. Furthermore, an AC (alternating current) motor such as a synchronous motor may be used.

Furthermore, in the foregoing embodiment, the control circuit 100 was provided with the CPU 101 and the ASIC 104. However, a configuration is possible in which only an ASIC directs the control of the motor 50 as the control circuit 100, and the control circuit 100 may also be configured in combination with a one-chip microcomputer or the like in which various peripheral devices other than these are incorporated. Furthermore, the control circuit 100 corresponds to a portion of the position detection means, a timing means, a power addition control means, a standby time measuring means, and an addition value incrementing means respectively, but a configuration may also be employed in which specialized circuits are provided respectively to achieve each of these means.

Further still, in the foregoing embodiment, the step duty is increased by employing a technique in which either multiplication was performed using a predetermined incremental fixed number or adding a fixed incremental amount. However, the increasing of the step duty is not limited to these, and may be increased in line with a fixed function such as a function indicating a quadratic curve for example.

Furthermore, in the foregoing embodiment, description was given concerning a case where the numerator Y in Y/X, which is the hold duty magnification, was varied for the initial duty. However, variation of the hold duty magnification is not limited to this. For example, it is also possible to achieve elimination of a condition of position overshooting and drive time overshooting by correcting the activation duty in the foregoing embodiment rather than the hold duty.

Furthermore, in the foregoing embodiment, the correction amount A and the correction amount B were changed incrementally as shown in FIG. 7 and FIG. 8. However, there is no limitation to incrementally changing the correction amount A and the correction amount B and for example a form may be employed in which change is performed continually using a predetermined formula.

Furthermore, in regard to S22 in FIG. 5 in the foregoing embodiment, the duty ratio at the point in time where the ENC interrupt signal is inputted may be reduced by multiplying the duty ratio by a predetermined ratio (0 to 1) of magnification. Furthermore, the original reading apparatus 10 according to the foregoing embodiment may be a portion of a compound apparatus such as a structure (a printer or copier machine or the like) provided with a printer function or the like.

What is claimed is:

1. A motor controlling method, comprising:

causing rotation of a motor to commence by applying an initial power that can cause movement of an object to be transported to commence, to the motor;

obtaining a position of the object to be transported after the motor has been controlled so as to cause the object to be transported to move to a target position, based on a signal outputted in response to the rotation of the motor;

correcting an initial power to be used when movement of the object to be transported is caused to commence a next time in response to a difference between the target position and the obtained position of the object to be transported; and when a motor is to be controlled so as to cause an object to be transported to move to a target position, measuring a drive time of the motor until the object to be transported is moved to the target position, wherein the correcting further comprises correcting the initial power to be used when movement of the object to be transported is caused to commence a next time, in response to a difference between a target drive time of when the object to be transported is to be moved to the target position and the obtained drive time.

2. A motor controlling method according to claim 1, wherein the initial power is a power in which an activation power for causing movement of the object to be transported to commence is added to a standby power that is a power unable to cause the object to be transported to start moving even when applied, and the correcting includes, when the obtained position of the object to be transported exceeds the target position, carrying out correction of the initial power by reducing the standby power used when movement of the object to be transported is caused to commence the next time.

3. A motor controlling method according to claim 2, wherein the correcting includes varying an amount by which the standby power is to be reduced in response to an amount by which the obtained position of the object to be transported exceeds the target position.

4. A motor controlling method according to claim 3, wherein the standby power is determined by multiplying a prescribed hold value that corresponds to a pre-correction standby power, by a predetermined magnification and the magnification can be expressed in a fraction form, and the correcting includes reducing the standby power by reducing a numerator of the fraction form.

5. A motor controlling method according to claim 1, wherein obtaining the position includes obtaining a position of an object to be transported by the motor based on a change in a rising edge and a change in a falling edge of the outputted signal.

6. A motor controlling method according to claim 1, wherein the motor is a DC motor.

7. A motor controlling method, comprising: causing rotation of a motor to commence by applying an initial power that can cause movement of an object to be transported to commence, to the motor; measuring a drive time of the motor until the object to be transported is moved to a target position; and correcting the initial power to be used when movement of the object to be transported is caused to commence a next time, in response to a difference between a target drive time of when the object to be transported is to be moved to the target position and the obtained drive time.

8. A motor controlling device, comprising:
- a controlling section that causes rotation of the motor to commence by applying an initial power that can cause movement of an object to be transported to commence, to a motor;
- a position calculating section that obtains a position of the object to be transported based on a signal outputted in response to the rotation of the motor, the position calculating section obtaining a position of the object to be transported after the motor has been controlled so as to cause the object to be transported to move to a target position;
- a correcting section that corrects the initial power to be used when movement of the object to be transported is caused to commence a next time in response to a difference between the target position and the obtained position of the object to be transported; and
- a measuring section that when a motor is to be controlled so as to cause an object to be transported to move to a target position, measures a drive time of the motor until the object to be transported is moved to the target position,
- wherein the correcting section further corrects the initial power to be used when movement of the object to be transported is caused to commence a next time, in response to a difference between a target drive time of when the object to be transported is to be moved to the target position and the obtained drive time.

9. A motor controlling device, comprising: a controlling section that causes rotation of the motor to commence by applying an initial power that can cause movement of an object to be transported to commence, to a motor; a time measuring section that, when a motor is to be controlled so as to cause an object to be transported to move to a target position, measures a drive time of the motor until the object to be transported is moved to the target position; and a correcting section that corrects the initial power to be used when movement of the object to be transported is caused to commence a next time, in response to a difference between a target drive time of when the object to be transported is to be moved to the target position and the obtained drive time.

10. An original reading apparatus, comprising:
- a controlling section that causes rotation of the motor to commence by applying an initial power that can cause movement of an object to be transported to commence, to a motor;
- a position calculating section that obtains a position of the object to be transported based on a signal outputted in response to the rotation of the motor, the position calculating section obtaining a position of the object to be transported after the motor has been controlled so as to cause the object to be transported to move to a target position;
- a correcting section that corrects the initial power to be used when movement of the object to be transported is caused to commence a next time in response to a difference between the target position and the obtained position of the object to be transported;
- a motor controlled by the controlling section; and
- an object to be transported whose original reading position is moved by the motor,
- a measuring section that when the motor is to be controlled so as to cause the object to be transported to move to a target position, measures a drive time of the motor until the object to be transported is moved to the target position,
- wherein the correcting section further corrects the initial power to be used when movement of the object to be transported is caused to commence a next time, in response to a difference between a target drive time of when the object to be transported is to be moved to the target position and the obtained drive time.

* * * * *